(12) United States Patent
Lee et al.

(10) Patent No.: US 7,420,641 B2
(45) Date of Patent: *Sep. 2, 2008

(54) METHOD OF FORMING AN ARRAY SUBSTRATE FOR IN-PLANE SWITCHING MODE LIQUID CRYSTAL DISPLAY DEVICE

(75) Inventors: Yun-Bok Lee, Seoul (KR); Jeong-Hyun Kim, Gunpo-si (KR)

(73) Assignee: LG Display Co., Ltd., Seoul (KR)

( * ) Notice: Subject to any disclaimer, the term of this patent is extended or adjusted under 35 U.S.C. 154(b) by 217 days.

This patent is subject to a terminal disclaimer.

(21) Appl. No.: 11/300,436

(22) Filed: Dec. 15, 2005

(65) Prior Publication Data

US 2006/0098150 A1    May 11, 2006

Related U.S. Application Data

(62) Division of application No. 10/825,376, filed on Apr. 16, 2004, now Pat. No. 7,006,188.

(30) Foreign Application Priority Data

Dec. 11, 2003    (KR) .................. 10-2003-0090359

(51) Int. Cl.
*G02F 1/1343* (2006.01)
(52) U.S. Cl. ...................................... 349/141
(58) Field of Classification Search .................. 349/141
See application file for complete search history.

(56) References Cited

U.S. PATENT DOCUMENTS 5,069,813 A    12/1991  Patel
5,434,687 A    7/1995   Kawata et al.
5,610,743 A    3/1997   Tsai (Continued)

FOREIGN PATENT DOCUMENTS

JP         09-325340        12/1997

(Continued)

*Primary Examiner*—James A Dudek
(74) *Attorney, Agent, or Firm*—McKenna Long & Aldridge LLP

(57) ABSTRACT

An array substrate for use in an in-plane switching liquid crystal display device includes a plurality of gate lines having a first direction on a substrate; a plurality of data lines having a second direction substantially perpendicular to the plurality of gate lines, wherein pairs of the gate and data lines define a pixel region; a common line in the first direction between the plurality of gate lines; a plurality of common electrodes extending from the common line in the pixel region, wherein the common electrodes have an arc shape; thin film transistors disposed at four corners of the pixel region near crossings of the gate and data lines; a capacitor electrode above a portion of the common electrodes, wherein the capacitor electrode is connected to a corresponding thin film transistor; and a plurality of pixel electrodes connected to the capacitor electrode and disposed between the arc shape of the common electrodes, wherein the pixel electrodes are arc shaped, wherein the pixel region is divided into a plurality of sub pixels, each of which includes one thin film transistor, at least one capacitor electrode, and at least one pixel electrode.

13 Claims, 11 Drawing Sheets

U.S. PATENT DOCUMENTS

| | | | |
|---|---|---|---|
| 5,977,562 A * | 11/1999 | Hirakata et al. | 349/141 |
| 6,243,154 B1 | 6/2001 | You et al. | |
| 6,483,566 B2 | 11/2002 | Youn et al. | |
| 6,621,102 B2 | 9/2003 | Hirakata et al. | |
| 7,177,001 B2 * | 2/2007 | Lee | 349/141 |
| 7,202,928 B2 * | 4/2007 | Lee et al. | 349/141 |
| 7,227,607 B2 * | 6/2007 | Lee | 349/141 |
| 2003/0053020 A1 | 3/2003 | Okada et al. | |
| 2005/0083466 A1 * | 4/2005 | Lee et al. | 349/141 |
| 2005/0128406 A1 * | 6/2005 | Lee | 349/141 |
| 2005/0140896 A1 * | 6/2005 | Chae et al. | 349/141 |
| 2005/0206822 A1 * | 9/2005 | Lee | 349/141 |
| 2005/0275783 A1 * | 12/2005 | Lee et al. | 349/141 |
| 2007/0109480 A1 * | 5/2007 | Lee | 349/141 |
| 2007/0146607 A1 * | 6/2007 | Lee et al. | 349/141 |
| 2007/0165171 A1 * | 7/2007 | Lee | 349/139 |

FOREIGN PATENT DOCUMENTS

| | | |
|---|---|---|
| JP | 2002-229046 | 8/2002 |
| JP | 2003-186017 | 7/2003 |
| KR | 1999-0058889 | 7/1999 |

* cited by examiner

METHOD OF FORMING AN ARRAY SUBSTRATE FOR IN-PLANE SWITCHING MODE LIQUID CRYSTAL DISPLAY DEVICE

This application is a Divisional of application Ser. No. 10/825,376, filed Apr. 16, 2004 now U.S. Pat. No. 7,006,188; which claims priority to Korean Patent Application No. 10-2003-0090359, filed Dec. 11, 2003, all of which are hereby incorporated by reference as if fully set forth herein.

This application claims the benefit of Korean Patent Application No. 2003-0090359, filed on Dec. 11, 2003, which is hereby incorporated by reference as if fully set forth herein.

BACKGROUND OF THE INVENTION

1. Field of the Invention

The present invention relates to liquid crystal display devices. More particularly, the present invention relates to liquid crystal display devices implementing in-plane switching (IPS) where an electric field applied to liquid crystals is generated in a plane parallel to a substrate.

2. Discussion of the Related Art

A liquid crystal display device uses the optical anisotropy and polarization properties of liquid crystal molecules to produce an image. Liquid crystal molecules have a definite orientational alignment as a result of their long, thin shapes. The alignment direction can be controlled by an applied electric field. In other words, as an applied electric field changes, so does the alignment of the liquid crystal molecules. Due to the optical anisotropy, the refraction of incident light depends on the alignment direction of the liquid crystal molecules. Thus, by properly controlling an applied electric field, a desired light image can be produced.

Of the different types of known liquid crystal displays (LCDs), active matrix LCDs (AM-LCDs), which have thin film transistors (TFTs) and pixel electrodes arranged in a matrix form, are the subject of significant research and development because of their high resolution and superiority in displaying moving images.

LCD devices have wide application in office automation (OA) equipment and video units because they are light and thin and have low power consumption characteristics. The typical liquid crystal display panel has an upper substrate, a lower substrate and a liquid crystal layer interposed there between. The upper substrate, commonly referred to as a color filter substrate, usually includes a common electrode and color filters. The lower substrate, commonly referred to as an array substrate, includes switching elements, such as thin film transistors and pixel electrodes.

As previously described, LCD device operation is based on the principle that the alignment direction of the liquid crystal molecules is dependent upon an electric field applied between the common electrode and the pixel electrode. Thus, the alignment direction of the liquid crystal molecules is controlled by the application of an electric field to the liquid crystal layer. When the alignment direction of the liquid crystal molecules is properly adjusted, incident light is refracted along the alignment direction to display image data. The liquid crystal molecules function as an optical modulation element having variable optical characteristics that depend upon polarity of the applied voltage.

In a conventional LCD device, because the pixel and common electrodes are positioned on the lower and upper substrates, respectively, the electric field induced between the pixel and common electrodes is perpendicular to the lower and upper substrates. However, the conventional LCD devices having the longitudinal electric field have a drawback in that they have a very narrow viewing angle. In order to solve the problem of narrow viewing angle, in-plane switching liquid crystal display (IPS-LCD) devices have been proposed. IPS-LCD devices typically include a lower substrate where a pixel electrode and a common electrode are disposed, an upper substrate having no electrode, and a liquid crystal interposed between the upper and lower substrates. A detailed explanation about operation modes of a typical IPS-LCD panel will be provided with reference to FIG. 1.

FIG. 1 is a schematic cross-sectional view illustrating a related art IPS-LCD panel. As shown in FIG. 1, upper and lower substrates 10 and 20 are spaced apart from each other, and a liquid crystal layer 30 is interposed there between. The upper and lower substrates 10 and 20 are often referred to as a color filter substrate and an array substrate, respectively. On the lower substrate 20 are a common electrode 22 and a pixel electrode 24. The common and pixel electrodes 22 and 24 are aligned parallel to each other. On a surface of the upper substrate 10, a color filter layer (not shown) is commonly positioned in a position between the pixel electrode 24 and the common electrode 22 of the lower substrate 20. A voltage applied across the common and pixel electrodes 22 and 24 produces an electric field 26 through the liquid crystal 32. The liquid crystal 32 has a positive dielectric anisotropy, and thus it aligns parallel to the electric field 26.

When no electric field is produced by the common and pixel electrodes 22 and 24, i.e., off state, the longitudinal axes of the liquid crystal (LC) molecules 32 are parallel and form a definite angle with the common and pixel electrodes 22 and 24. For example, the longitudinal axes of the LC molecules 32 are arranged parallel with both the common and pixel electrodes 22 and 24.

On the contrary, when a voltage is applied to the common and pixel electrodes 22 and 24, i.e., on state, an in-plane electric field 26 that is parallel to the surface of the lower substrate 20 is produced because the common and pixel electrodes 22 and 24 are on the lower substrate 20. Accordingly, the LC molecules 32 are re-arranged to bring their longitudinal axes into coincidence with the electric field 26.

The result is a wide viewing angle that ranges from about 80 to 85 degrees in up-and-down and left-and-right sides from a line vertical to the IPS-LCD panel.

FIG. 2 is a plan view illustrating one pixel of an array substrate according to a related art IPS-LCD device. As shown, gate lines 40 are transversely arranged and data lines 42 are disposed substantially perpendicular to the gate lines 40. A common line 50 is also transversely arranged parallel with the gate line 40 and is spaced apart from the gate line 40. The gate line 40, the common line 50 and a pair of the data lines 42 define a pixel region P on the array substrate. A thin film transistor (TFT) is disposed at a corner of the pixel region P near the crossing of the gate and data lines 40 and 42.

In each pixel, three common electrodes 44 extend perpendicularly from the common line 50, and two of the common electrodes 44 are disposed next to the data lines 42, respectively. A pixel connecting line 48 is disposed next to the gate line 40 and parallel with the gate line 40, and is electrically connected to the TFT T. Pixel electrodes 46 extend perpendicularly from the pixel connecting line 48 toward the common line 50. Each of the pixel electrodes 46 is disposed between two of the common electrodes 44 parallel with the data line 42. Each of areas "I" between the respective common electrodes 44 and the respective pixel electrodes 46 is defined as a block where the liquid crystal molecules are re-arranged by the electric fields. In FIG. 2, there are four blocks in one pixel.

As shown in FIG. 2, the IPS-LCD device according to the related art rearranges and operates the liquid crystal molecules using the electric field generated parallel to the array substrate. Thus, it can provide a wide viewing angle as opposed to a LCD device having an electric field perpendicular to the array substrate. Some modifications have occurred in the IPS-LCD device in order to further increase the viewing angle.

FIG. 3 is a plan view of an array substrate for use in an IPS-LCD device having multiple domains according to related art. In FIG. 3, details previously explained with reference to FIG. 2 will be omitted to avoid duplication.

In FIG. 3, a pixel connecting line 58 is disposed over a common line 60. Common and pixel electrodes 54 and 56 are elongated from the common and pixel connecting lines 60 and 58, respectively, in an up-and-down direction. Both the common and pixel electrodes 54 and 56 have a zigzag shape with plural bent portions, but they are parallel to each other and arranged alternately. The zigzag shape defines the multi domains in the pixel regions symmetrically to the bent portions of the common and pixel electrodes 54 and 56. These structures of zigzag shape and the multi-domains improve the viewing angle rather than the straight shape of FIG. 2.

Moreover in FIG. 3, the pixel connecting line 58 overlaps the common line 60 so that an overlapped area becomes a storage capacitor $C_{ST}$. Namely, the pixel connecting line 58 acts as one electrode of the storage capacitor $C_{ST}$, while the overlapped portion of the common line 60 acts as the other electrode of the storage capacitor $C_{ST}$. One of the pixel electrodes 56 is connected to a drain electrode 62 so that all of the pixel electrodes 56 can electrically communicate with the TFT T.

However, the IPS-LCD device having the above-mentioned multidomains has a problem of color shift depending on the viewing angles, because the liquid crystal molecules have long and thin shapes.

FIG. 4 is a graph illustrating viewing angle properties of the IPS-LCD device having the zigzag structure of FIG. 3. The IPS-LCD device having the zigzag-shaped common and pixel electrodes can have the improved viewing angles in directions of ±90 and ±180 degrees, i.e., in right-and-left and up-and-down directions, as illustrated by references "IVa" and "IVb" in FIG. 4. However, the viewing angles are degraded in directions of ±45 and ±135 degrees, i.e., in diagonal directions, as illustrated by references "IVc" and "IVd" in FIG. 4. Furthermore, the color shift also occurs depending on the viewing angles or directions.

When the voltages applied to the electrodes generate the electric fields between the common and pixel electrodes, the liquid crystal molecules rotate about 45 degrees in accordance with the electric fields. Then, gray inversion occurs due to the rotation of the liquid crystal molecules. When the IPS-LCD is operated in gray mode, the IPS-LCD produces yellowish color in 45(+45) degrees declination with respect to the liquid crystal polarization because of the optical anisotropy properties of liquid crystal molecules. And the IPS-LCD also produces bluish color in 135(−45) degrees declination with respect to the liquid crystal polarization because of the optical anisotropy properties of the liquid crystal molecules.

SUMMARY OF THE INVENTION

Accordingly, the present invention is directed to an array substrate for an in-plane switching mode liquid crystal display device IPS-LCD and method of fabricating the same that substantially obviates one or more of the problems due to limitations and disadvantages of the related art.

An advantage of the present invention is to provide an array substrate and a method of forming the array substrate for use in an IPS-LCD device, which increase a viewing angle and prevent a color shift.

Another advantage of the present invention is to provide an array substrate and a method of forming the array substrate for use in an IPS-LCD device, which provide uniform director of liquid crystal molecules in all directions.

Additional features and advantages of the invention will be set forth in the description which follows and in part will be apparent from the description, or may be learned by practice of the invention. These and other advantages of the invention will be realized and attained by the structure particularly pointed out in the written description and claims hereof as well as the appended drawings.

To achieve these and other advantages, an embodiment in accordance with the principles of the present invention provides an array substrate for use in an in-plane switching liquid crystal display device. The array substrate includes a plurality of gate lines having a first direction on a substrate; a plurality of data lines having a second direction substantially perpendicular to the plurality of gate lines, wherein pairs of the gate and data lines define a pixel region; a common line in the first direction between the plurality of gate lines; a plurality of common electrodes extending from the common line in the pixel region, wherein the common electrodes have an arc shape; thin film transistors disposed at four corners of the pixel region near crossings of the gate and data lines; a capacitor electrode above a portion of the common electrodes, wherein the capacitor electrode is connected to a corresponding thin film transistor; and a plurality of pixel electrodes connected to the capacitor electrode and disposed between the arc shape of the common electrodes, wherein the pixel electrodes are arc shaped, wherein the pixel region is divided into a plurality of sub pixels, each of which includes one thin film transistor, at least one capacitor electrode, and at least one pixel electrode.

In another aspect, a method of forming an array substrate for use in an in-plane switching liquid crystal display device is provided. The method includes forming gate lines, common lines, gate electrodes, and common electrodes, wherein the common line is disposed between two gate lines, the gate electrode extends from the gate lines toward the common line, and the common electrode extends from the common line and is arc shaped; forming a gate insulating layer on the gate lines, common lines, gate electrodes, and common electrodes; forming a semiconductor layer on the gate insulating layer, the semiconductor layer including a first layer of pure amorphous silicon and a second layer of doped amorphous silicon; forming data lines, source electrodes and drain electrodes, wherein the data lines are substantially perpendicular to cross the gate and common lines, each of the source electrodes extending from the data lines over a first end portion of the semiconductor layer, each of the drain electrodes being spaced from a corresponding source electrode and overlapping a second end portion of the semiconductor layer, and pairs of the gate and data lines defining a pixel region, wherein the pixel region is divided into a plurality of sub pixels; forming a passivation layer on the data lines, the source electrodes and the drain electrodes; the passivation layer having drain contact holes exposing a portion of the drain electrodes; and forming capacitor electrodes and pixel electrodes, the capacitor electrode being disposed over a portion of the common electrodes and in contact with the drain electrodes through the drain contact holes in each of the sub pixels, wherein the pixel electrodes are connected to the capacitor electrodes in each of the sub pixels through a pixel connecting line, wherein the common electrodes and the pixel electrodes are arc shaped within the pixel region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate an embodiment of the present invention and together with the description serve to explain the principles of that invention.

In the drawings.

DETAILED DESCRIPTION OF THE ILLUSTRATED EMBODIMENTS

Reference will now be made in detail to an illustrated embodiment of the present invention, examples of which are illustrated in the accompanying drawings. Wherever possible, similar reference numbers will be used throughout the drawings to refer to the same or similar parts.

Figure 1:
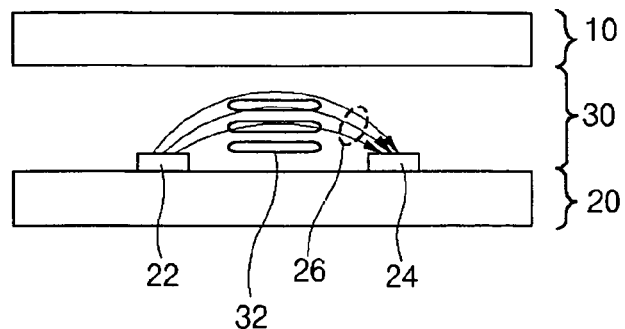
FIG. 1 is a schematic cross-sectional view illustrating a concept of a related art IPS-LCD panel.
Figure 2:
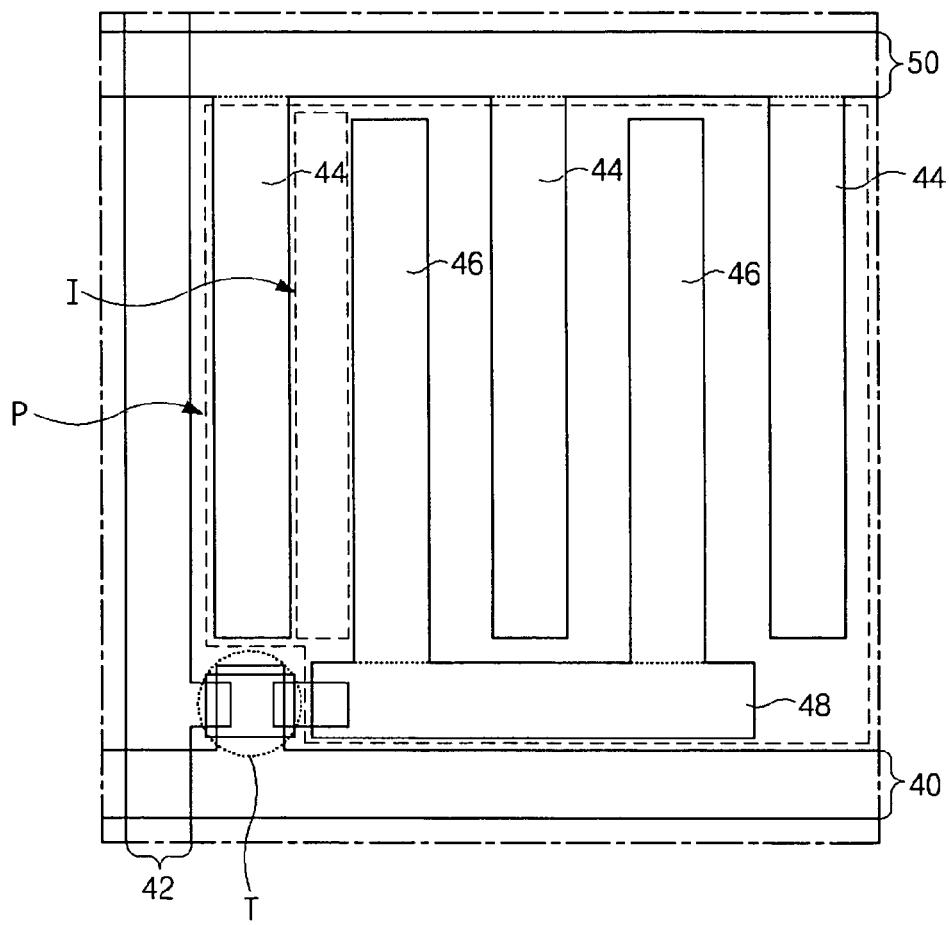
FIG. 2 is a plan view illustrating one pixel of an array substrate according to a related art IPS-LCD device.
Figure 3:
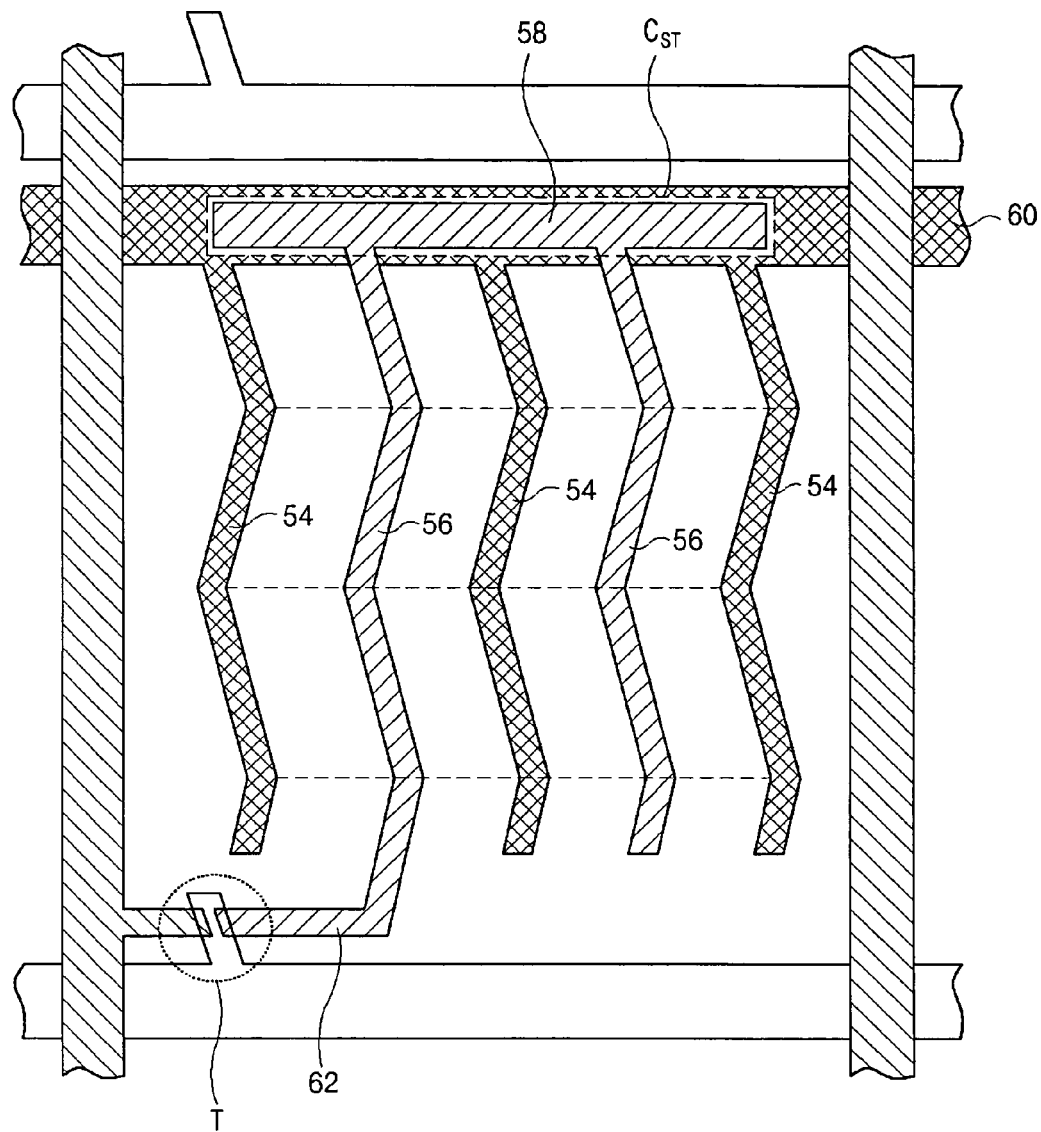
FIG. 3 is a plan view of an array substrate for use in an IPS-LCD device having multiple domains according to another related art.
Figure 4:
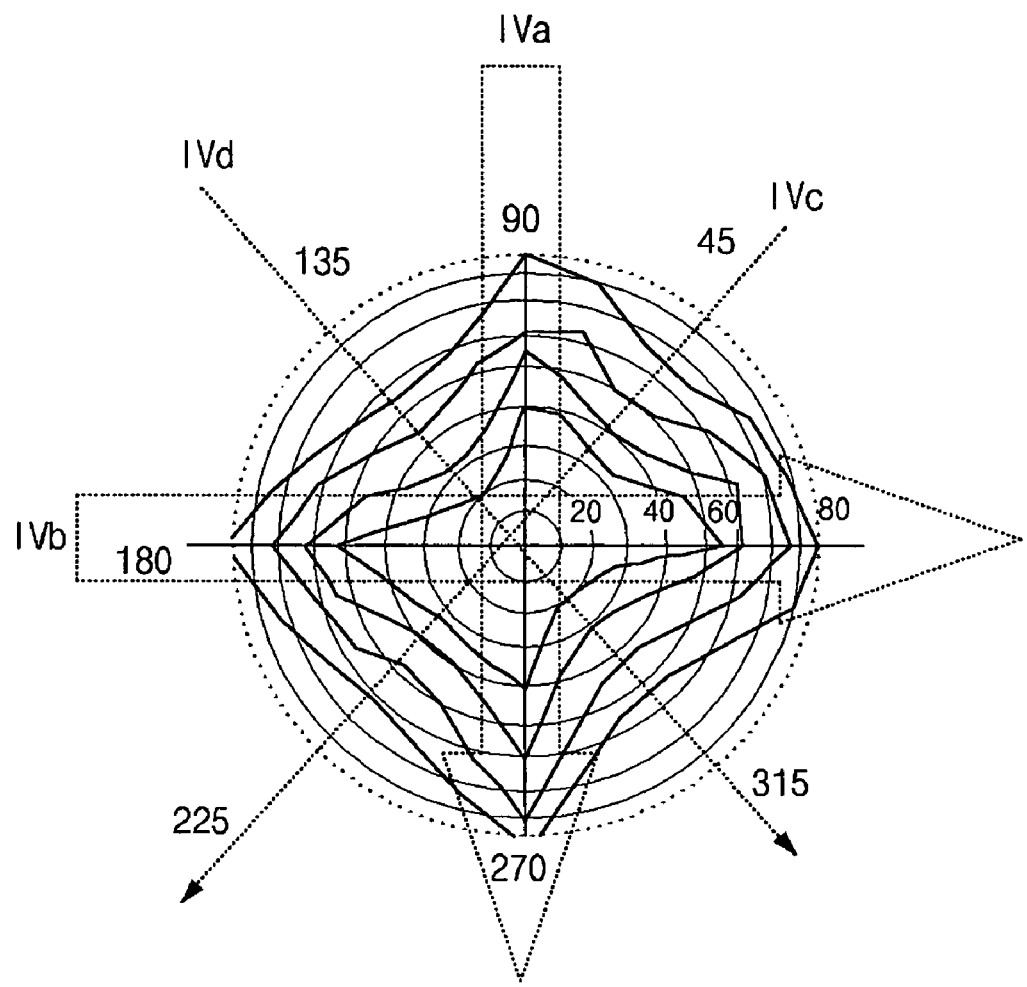
FIG. 4 is a graph illustrating a viewing angle of the IPS-LCD device having the zigzag structure of FIG. 3.
Figure 5:
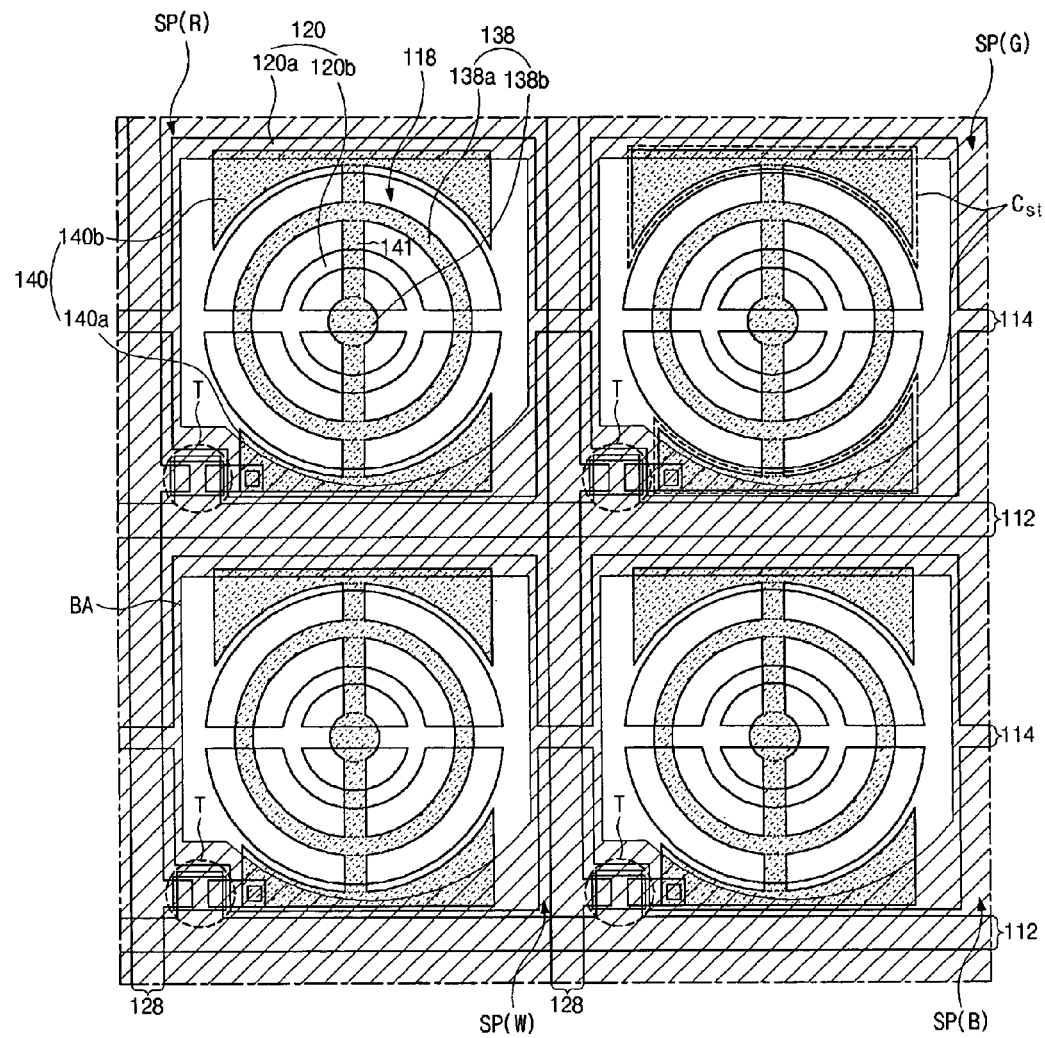
FIG. 5 is a plan view illustrating an array substrate for use in an IPS-LCD device according a first embodiment of the present invention.

FIG. 5 is a plan view illustrating an array substrate for use in an IPS-LCD device according to a first embodiment of the present invention. In FIG. 5, the common and pixel electrodes have a substantially circular shape, and one pixel is comprised of four sub-pixels (red, green, blue and white sub-pixels).

As shown in FIG. 5, gate lines 112 are transversely arranged and data lines 128 are disposed substantially perpendicular to the gate lines 112. Pairs of gate and data lines 112 and 128 define sub-pixel regions SP(R), SP(G), SP(B) and SP(W) on the array substrate. The four sub-pixel regions form one pixel. Specifically, one pixel includes the four sub pixels SP(R), SP(G), SP(B) and SP(W).

A thin film transistor (TFT) T is disposed near each crossing of the gate and data lines 112 and 128, respectively, such that each sub pixel SP(R), SP(G), SP(B) or SP(W) includes one TFT T. In particular, each of the sub pixels SP(R), SP(G), SP(B) and SP(W) has a TFT at a bottom left corner thereof. The gate and data lines 112 and 128 act as borders of neighboring sub pixels SP(R), SP(G), SP(B) and SP(W). A common line 114 that is substantially parallel with the gate lines 112 is formed at a middle position between the neighboring gate lines 112.

A first common electrode pattern 120a is formed in each of the sub pixels SP(R), SP(G), SP(B) and SP(W). The first common electrode pattern 120a surrounds the sub pixel region and has a circular opening 118 in the middle. The first common electrode pattern 120a is connected to the common line 114. Moreover, a second common electrode pattern 120b that is shaped like a circular band extends from the common line 114 and is formed in the circular opening 118 within the sub pixel region SP(R), SP(G), SP(B) or SP(W). Thus, the common line 114 corresponds and crosses a diametric line of the circular band shaped second common electrode pattern 120 and the circular opening 118. The first and second common electrode patterns 120a and 120b form a common electrode 120.

A capacitor electrode 140 is formed in an area where the first common electrode pattern 120a is disposed such that the capacitor electrode 140 overlaps the first common electrode patter 120a and forms a storage capacitor $C_{st}$ with the overlapped portions of the first common electrode pattern 120a. The capacitor electrode 140 includes a first capacitor electrode pattern 140a and a second capacitor electrode pattern 140b, respectively, in the bottom and top portion of the sub pixel. The first capacitor electrode 140a is connected to the TFT T. A first pixel electrode pattern 138a having a circular band shape is disposed between the first and second common electrode patterns 120a and 120b, and a second pixel electrode pattern 138b having a circular shape is disposed in the inside of the circular band shaped second common electrode pattern 120b. The first and second pixel electrode patterns 138a and 138b form a pixel electrode 138. A pixel connecting line 141 is vertically disposed in the middle of the sub pixel and connects the first and second capacitor electrode patterns 140a and 140b. Furthermore, the pixel connecting line 141 also connects the first pixel electrode pattern 138a to the second pixel electrode pattern 138b. Accordingly, the pixel electrode 138, the capacitor electrode 140 and the pixel connecting line 141 are formed as one united body during the same patterning process.

In the first embodiment illustrated with reference to FIG. 5, aperture areas defined in between the common and pixel electrodes 120 and 138 have a circular structure. Thus, a liquid crystal director is the same in all directions such that a color shift can be prevented. Furthermore, the image quality of the IPS-LCD is improved, and the IPS-LCD has a wider viewing angle.

An area "BA" depicted by oblique line hatching denotes a black matrix in FIG. 5. The black matrix BA covers the gate and data lines 112 and 128 and the thin film transistors T.

The circular structure shown in FIG. 5 improves the viewing angle and image quality of the IPS-LCD, but it may be necessary to modify the above-mentioned structure for use in a Ultra Extended Video Graphics Array (UXVGA) (1600× 1200) display for high aperture ratio and resolution.

Figure 6:
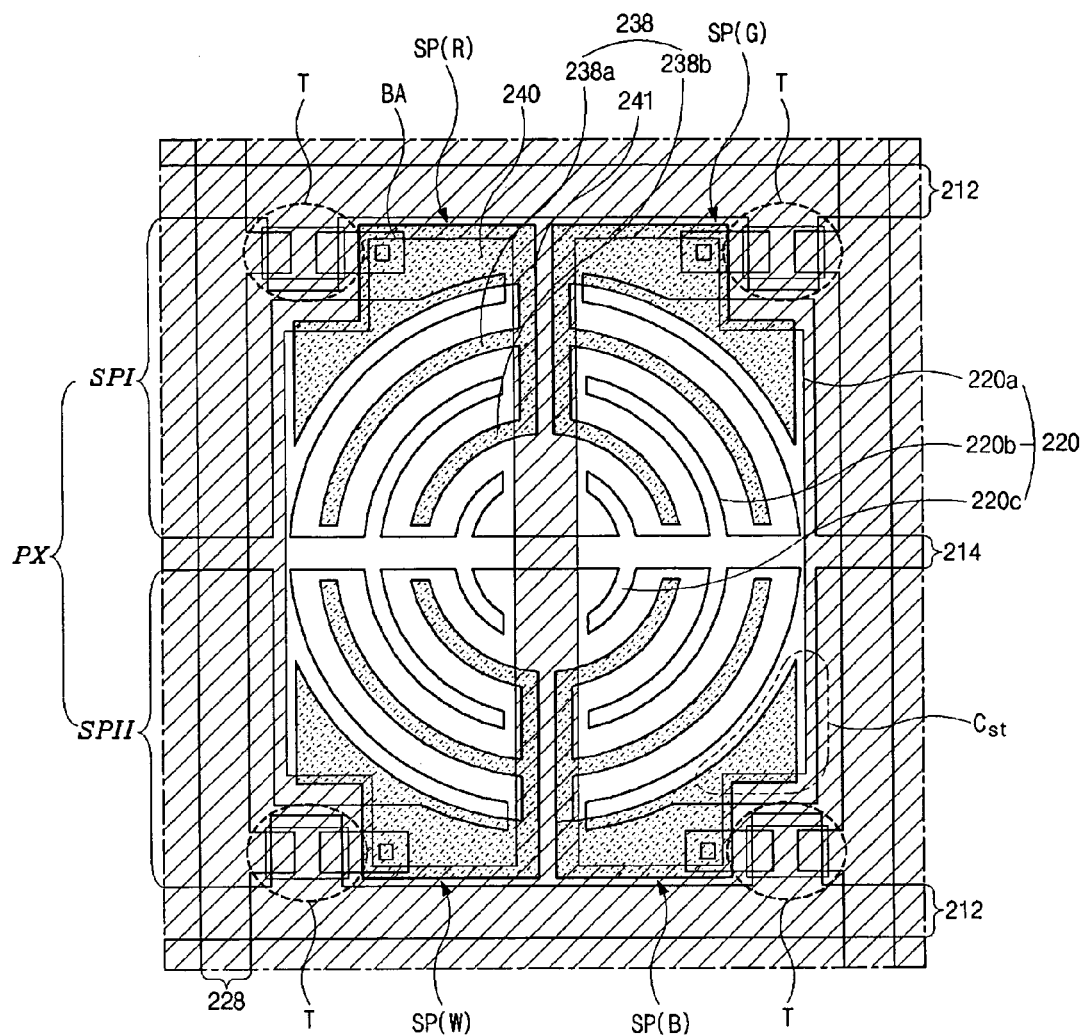
FIG. 6 is a plan view illustrating one pixel of an array substrate for use in an IPS-LCD device according a second embodiment of the present invention.

FIG. 6 is a plan view illustrating one pixel of an array substrate for use in an IPS-LCD device according a second embodiment of the present invention.

As shown in FIG. 6, gate lines 212 are transversely arranged and data lines 228 are disposed substantially perpendicular to the gate lines 112. Pairs of gate and data lines 212 and 228 define one pixel PX on an array substrate. A common line 214 is transversely disposed in the middle of the pixel PX between the gate lines 212 and crosses the data lines 228.

In FIG. 6, the one pixel PX is divided by the common line 214 into two sub-pixel groups "SPI" and "SPII." The first and second sub-pixel groups "SPI" and "SPII" have a geometrically symmetrical structure with respect to the common line 214. The first sub-pixel group "SPI" includes a red sub pixel SP(R) and a green sub pixel SP(G), and the second sub-pixel group "SPII" includes a white sub pixel SP(W) and a blue sub pixel SP(B). Accordingly, the four sub pixels SP(R), SP(G), SP(B) and SP(W) form a single pixel PX.

Unlike the first embodiment, a data line 228 is not disposed between the red and green sub pixels, SP(R) and SP(G), and between the white and blue sub pixels, SP(W) and SP(B), and a gate line 212 is not disposed between the red and white sub pixels, SP(R) and SP(W), and between the green and blue sub pixels, SP(G) and SP(B). Thin film transistors (TFTs) are located at four corners of the pixel PX, thin film transistors (TFTs). Thus, each of the sub pixels SP(R), SP(G), SP(B) and SP(W) has one TFT T. The TFT in the first sub pixel group "SPI" is symmetrically disposed and has a structure symmetrical to those in the second sub pixel group "SPII".

A first common electrode pattern 220a is formed in peripheries of the pixel PX and has a circular-shaped opening therein. Second and third common electrode patterns 220b and 220c are disposed in the circular-shaped opening and, each common electrode pattern has a semicircular shape. The third common electrode patterns 220c is further inside the sub pixel the second common electrode patterns 220b. Left portions of the semicircular shaped second and third common electrode patterns 220b and 220c are spaced apart from right portions thereof, but are connected through the common line 214. Additionally, a left portion of the first common electrode pattern 220a is spaced apart from a right portion thereof, but connected to each other through the common line 214. The first to third common electrode patterns 220a-220c form the common electrode 220.

Capacitor electrodes 240 are formed in the pixel PX and overlap the first common electrode patterns 220a. Each of the capacitor electrodes 240 overlaps a portion of the first common electrode patterns 220a within each sub pixels SP(R), SP(G), SP(B) and SP(W). Each of the capacitor electrodes 240 forms a storage capacitor $C_{st}$ with the overlapped portion of the first common electrode patterns 220a in each of the sub pixels SP(R), SP(G), SP(B) and SP(W). Furthermore, each of the capacitor electrodes 240 is connected to the corresponding TFT T. An inner side of the capacitor electrode 240 is arc shaped and corresponds to the inner side of the first common electrode 220a. A pixel connecting line 241 extends vertically from the respective capacitor electrode 240, but it may extend transversely. Within each of the sub pixels SP(R), SP(G), SP(B) and SP(W), first and second pixel electrode patterns 238a and 238b, each being arc shaped, extend from the pixel connecting line 241. The first pixel electrode pattern 238a is disposed between the first and second common electrode patterns 220a and 220b, and the second pixel electrode pattern 238b is between the second and third common electrode patterns 220b and 220c. The first and second pixel electrode patterns 238a and 238b form a pixel electrode 238 within each of the sub pixels SP(R), SP(G), SP(B) and SP(W).

The first to third common electrode patterns 220a-220c in the first sub pixel group "SPI" are symmetrical to those in the second sub pixel group "SPII", and all of the first to third common electrode patterns 220a-220c are geometrically connected through the common line 214. The capacitor electrode 240, the pixel connecting line 241 and the pixel electrode 238 are respectively formed in each of the sub pixels SP(R), SP(G), SP(B) and SP(W), and electrically and geometrically isolated from those in a neighboring sub pixel.

An area "BA" depicted by oblique line hatching denotes a black matrix in FIG. 6. The black matrix BA covers the gate and data lines 212 and 228 and the thin film transistors T. Moreover, the black matrix BA vertically crosses the pixel PX by covering the pixel connecting lines 241. As compared to the first embodiment, it is distinguishable in the second embodiment that the area overlapped by the black matrix BA decreases because the black matrix does not transversely cross the pixel PX. Thus, the aperture ratio dramatically increases in the second embodiment when compared to the first embodiment.

The pixel structure illustrated in FIG. 6 may be used as a DD-GG type IPS-LCD device.

Figure 7:
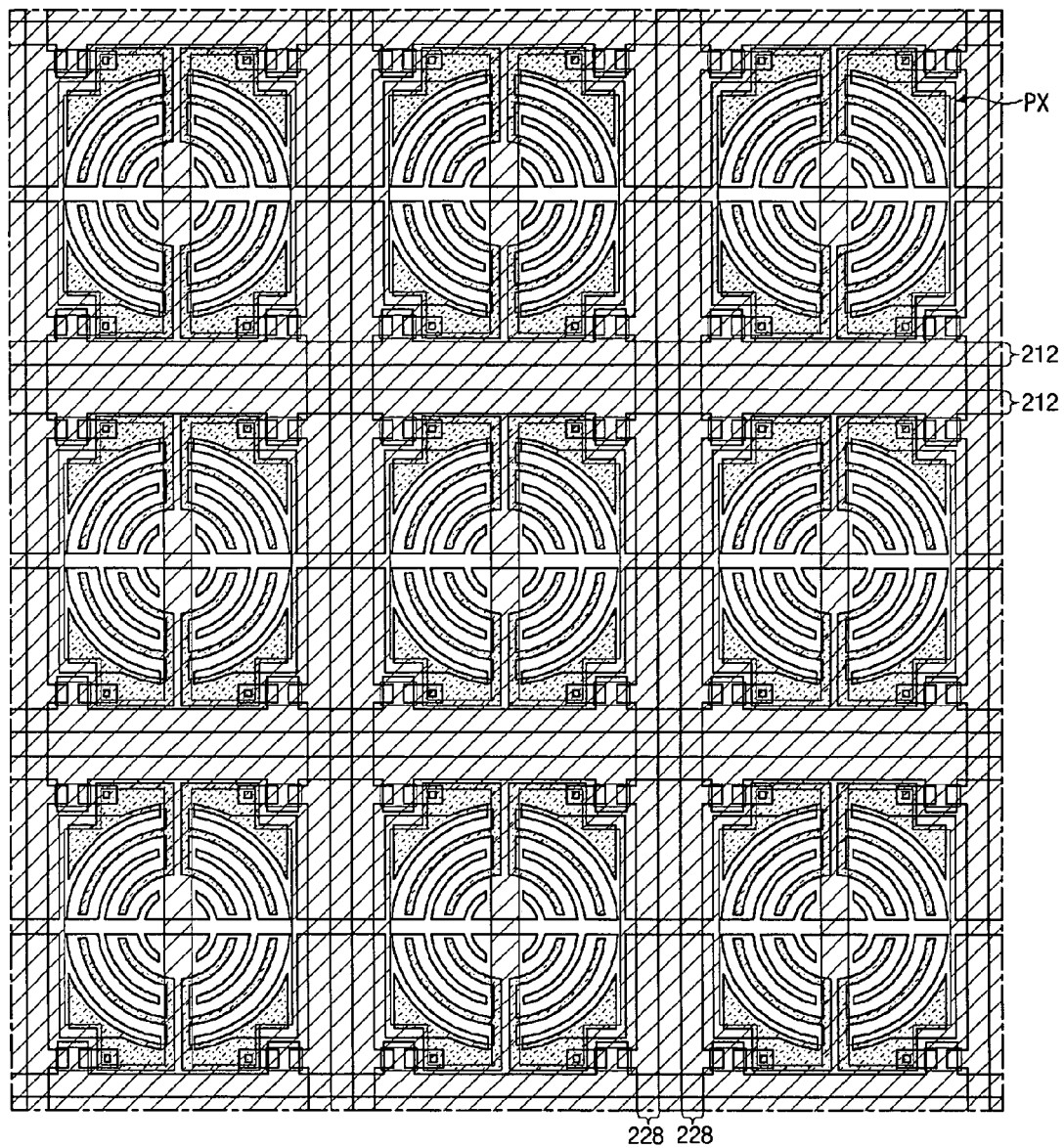
FIG. 7 is a plan view illustrating several pixels when the array substrate of FIG. 6 is used as a DD-GG type.

FIG. 7 is a plan view illustrating several pixels when the array substrate of FIG. 6 is used as a DD-GG type. As illustrated in FIG. 7, two gate lines 212 and two data lines 228 are disposed between two neighboring pixels PX in each of the four sub pixels illustrated in FIG. 6 are located. To increase the aperture ratio, the black matrix vertically crosses the pixel PX, but does exist horizontally.

Although the pixel in FIGS. 5, 6 and 7 is illustrated to have a four-sub-pixel structure, i.e., red, green, blue and white sub pixels, a three-sub-pixel structure may be employed in the IPS-LCD device, for example, with red, green and blue sub-pixels.

FIGS. 8A-8E are plan views illustrating a five-mask process of forming the array substrate of FIG. 6.

Figure 8A:
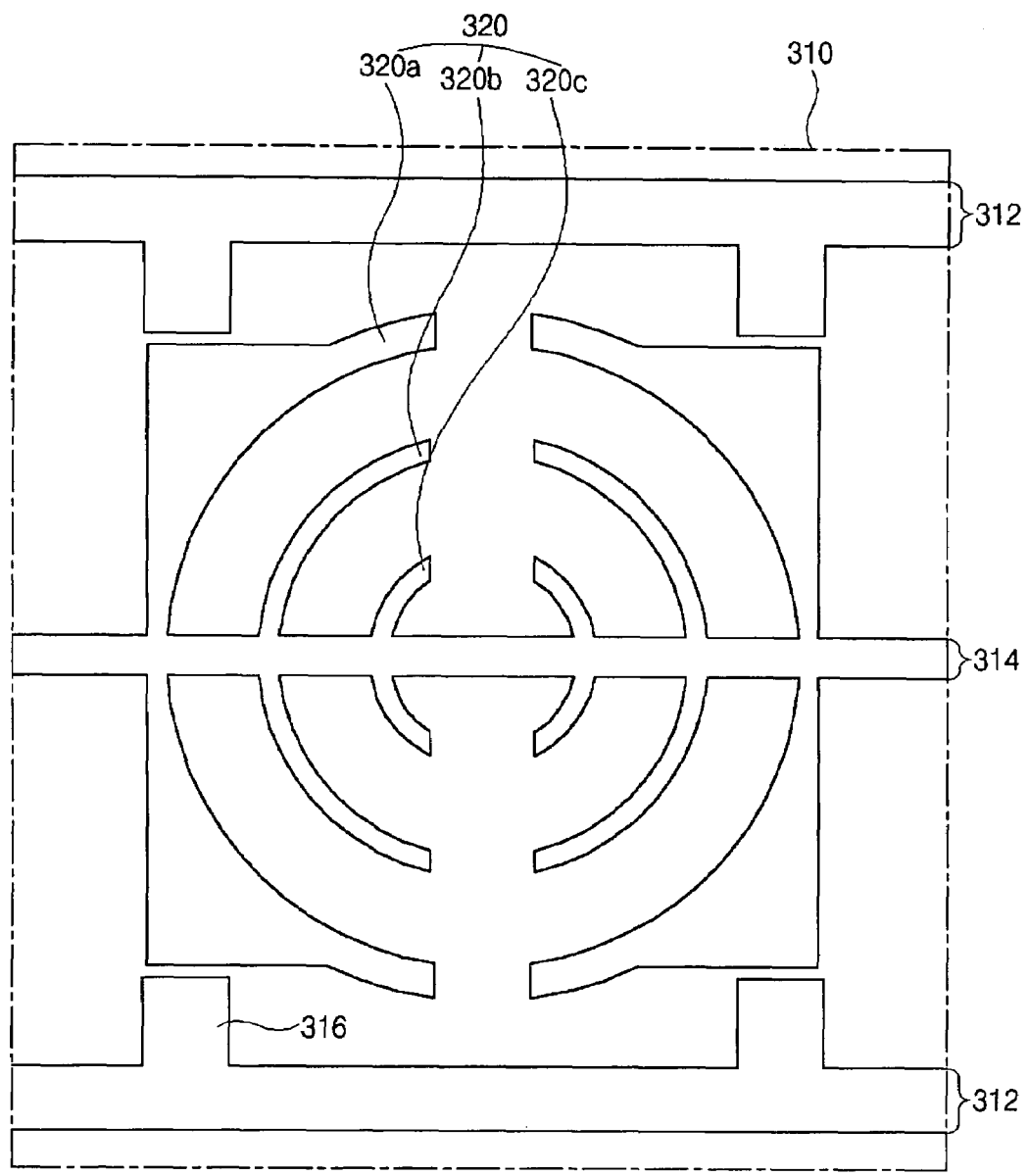
FIGS. 8A to 8E are plan views illustrating the process steps of forming the array substrate of FIG. 6.

In FIG. 8A, a first metal layer is formed on a substrate 310 and then patterned through a photolithography process using a first mask, to form a gate line 312 and a common line 314. Gate electrodes 316 and first to third common electrode patterns 320a-320c are also formed. The common line 314 is disposed between the two gate lines 312. The gate electrodes 316 extend from the gate lines 312 towards the common line 314. The first to third common electrode patterns 320a-320c extend from the common line 314 and each has a semicircular shape. The first to third common electrode patterns 320a-320c form common electrode 320. Left portions of the first to third common electrode patterns 320a-320c are symmetrical to right portions thereof, such that both portions can be arranged to have a substantially circular shape.

Figure 8B:
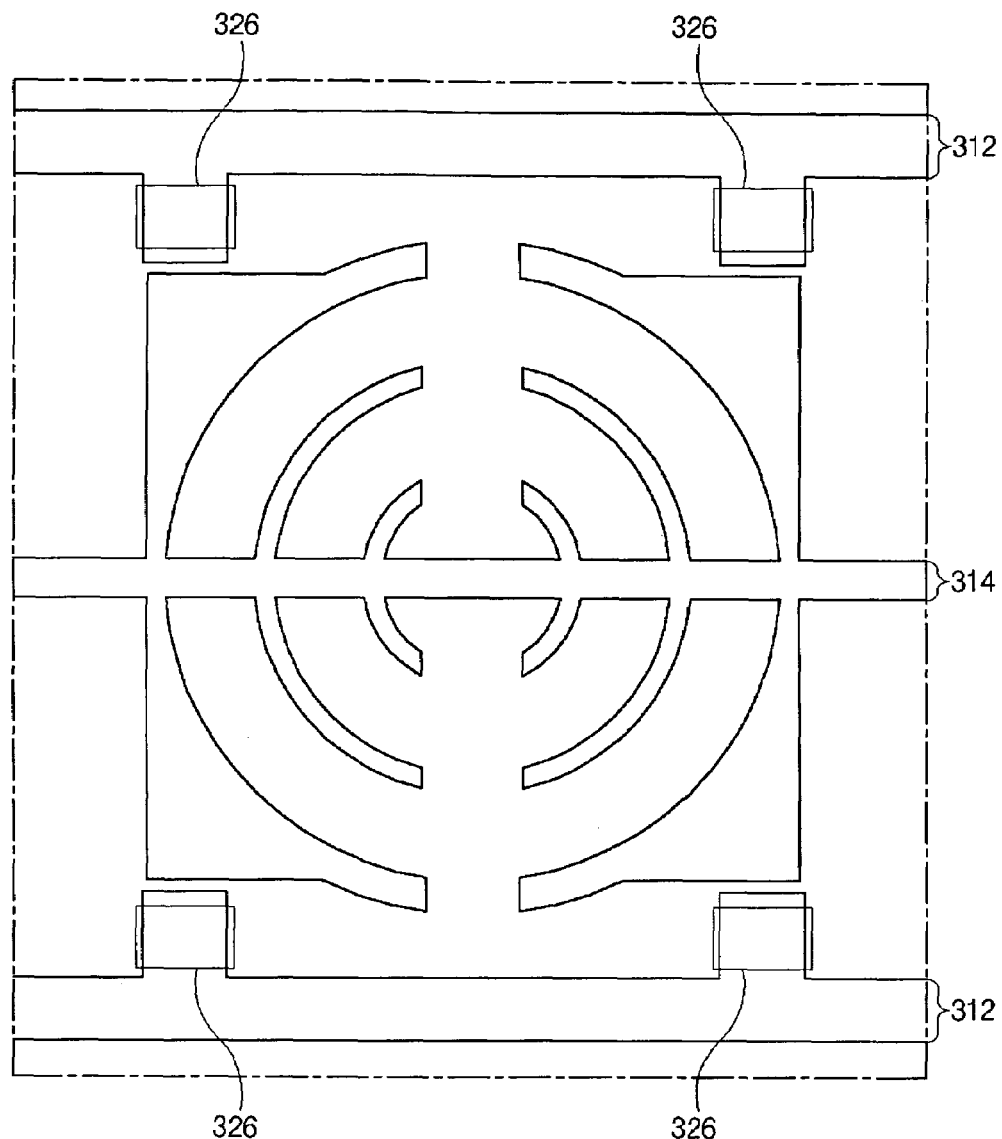

In FIG. 8B, a gate insulation layer (not shown) is formed on the substrate 310 to cover the above-mentioned patterned metal layer. Thereafter, a pure amorphous silicon layer and a doped amorphous silicon layer are formed on the gate insulation layer, and patterned, using a second mask process, to form semiconductor layers 326, each having an island shape. Each of the semiconductor layers 326 is comprised of a first layer of pure amorphous silicon and a second layer of doped amorphous silicon, and is disposed above the gate electrode 316.

Figure 8C:
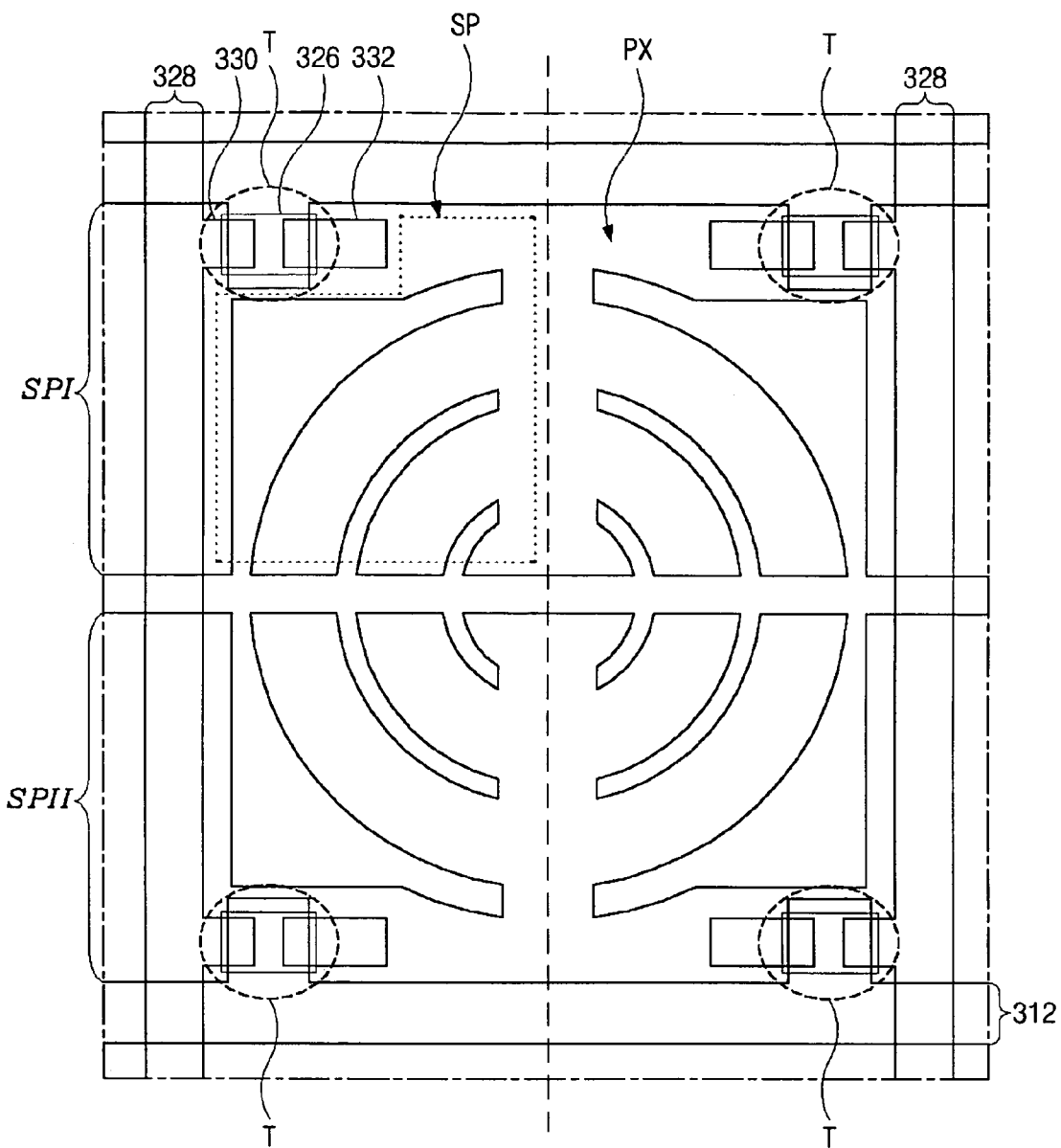

In FIG. 8C, a second metal layer is formed on the gate insulation layer (not shown) to cover the semiconductor layers 326 and is patterned, using a third mask process, to form data lines 328. Pairs of the gate and data lines 312 and 328, respectively, define a pixel PX. The pixel PX may be divided by the common line 314 into two sub-pixel groups "SPI" and "SPII". Each sub-pixel groups includes two sub pixels SP.

A source electrode 330 extends from each data line 328 over a first portion of each semiconductor layer 326, and a drain electrode 332, is formed to overlap a second portion of the semiconductor layer 326, the drain electrode being spaced apart from the source electrode 330. The gate electrode 316, the semiconductor layer 326 and the source and drain electrodes 330 and 332 form a thin film transistor T that is formed at a corner of each sub pixel SP. The thin film transistors T are disposed at the four corners of the pixel PX near a crossing point of the data line 328 and the gate line 312. The thin film transistor T has a geometrical structure that is substantially symmetrical to that of neighboring sub pixels.

Although not shown in FIG. 8C but shown in FIG. 7, the gate line 312 and the data line 328 may be disposed next to that of a neighboring pixel. This scenario is often called a DD-GG structure. Specifically, the gate and data lines 312 and 328, respectively, are not located between the sub-pixels SP. As a result, the aperture ratio increases.

Figure 8D:
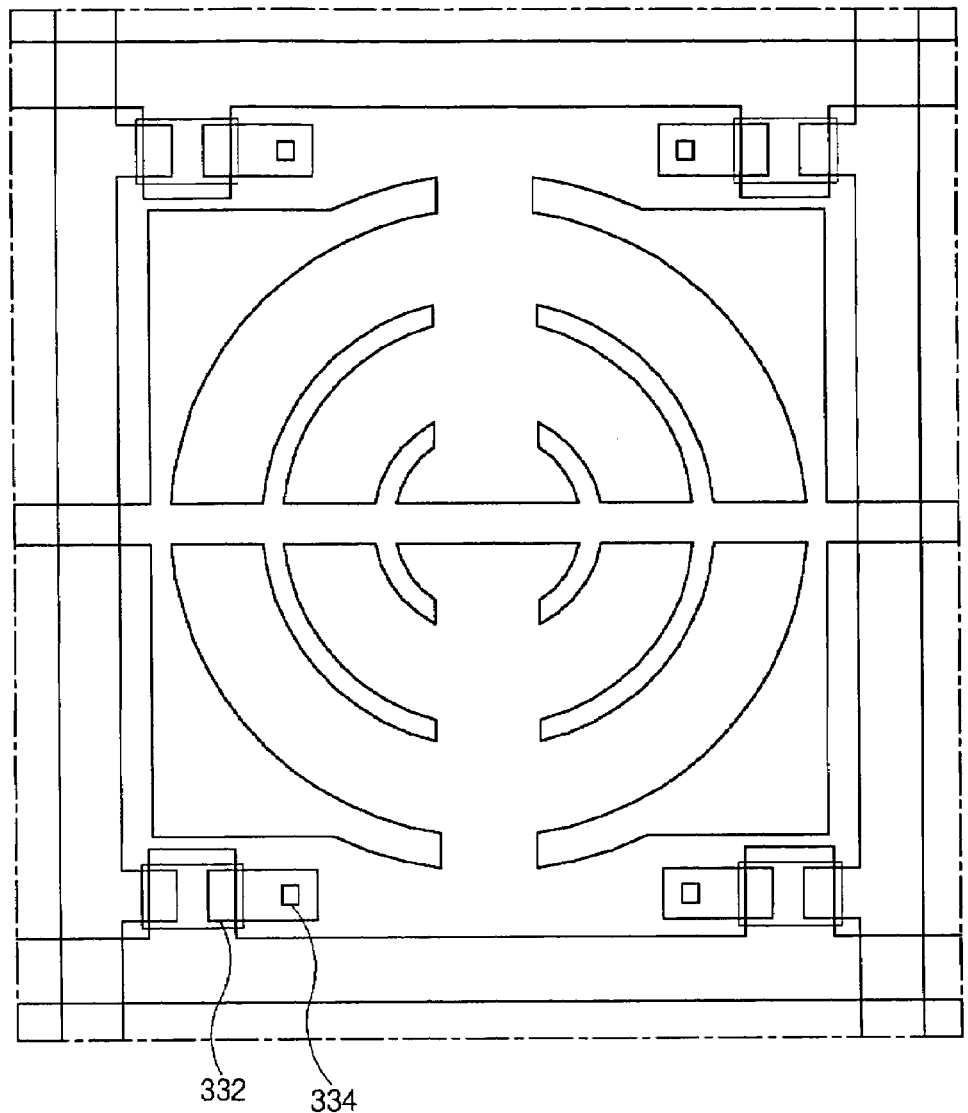

In FIG. 8D, a passivation layer (not shown) is formed over an entire surface of the substrate to cover the second patterned metal. Thereafter, the passivation layer is patterned using a fourth mask process to form drain contact holes 334, each of which exposes a portion of each drain electrode 332.

Figure 8E:
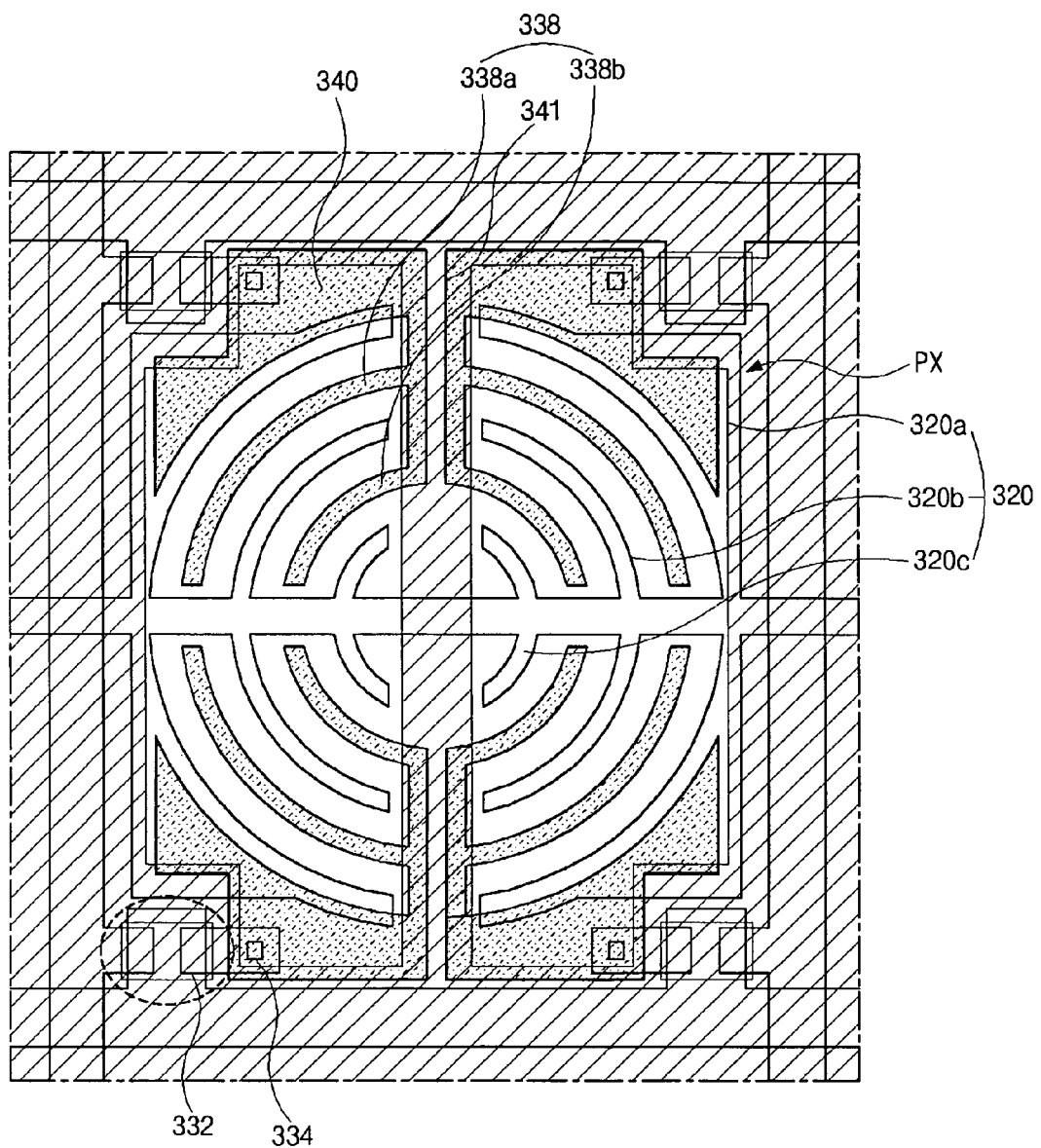

In FIG. 8E, a conductive layer is formed on the patterned passivation layer and then patterned using a fifth mask process to form capacitor electrodes 340, pixel connecting lines 341, and pixel electrodes 338, each comprising first and second pixel electrode patterns 338a and 338b. The capacitor electrodes 340 are disposed to overlap the first pixel electrode patterns 338a, and each pixel electrode is connected to the drain electrode 332 of the corresponding TFT T through the drain contact hole 334. Each of the capacitor electrodes 340 is independently disposed in each sub pixel without connection to the neighboring capacitor electrode. The pixel connecting lines 341 extend from the capacitor electrodes 340 to the inside of the pixel PX. The first and second pixel electrode patterns 338a and 338b extend from the pixel connecting line 341, and each of them is shaped like a arc. The first pixel electrode patterns 338a are disposed between the first and second common electrode patterns 320a and 320b, and the second pixel electrode patterns 338b are disposed between the second and third common electrode patterns 320b and 320c. In the pixel region PX, the first pixel electrode patterns 338a and the second pixel electrode patterns 338b form an arc shape. Moreover, the pixel electrode patterns and the common electrode patterns are arranged in an alternating pattern in the pixel PX, as shown in FIG. 8E.

After forming the pixel electrode 338 and the capacitor electrode 340, a black matrix is formed to cover the gate and data lines and the thin film transistors. In a second embodiment of the present invention, the black matrix may also overlap the pixel connecting lines 341 vertically crossing the pixel PX.

In the second embodiment of the present invention, the areas defined between the pixel and common electrodes 338 and 320 are substantially circular shaped in which the liquid crystal directors are uniform in all directions. Thus, color shift is prevented, and the viewing angle is improved in the multiple domains.

Although the fabrication process illustrated with reference to FIGS. 8A-8E shows a five-mask process, the DD-GG type array substrate for use in the IPS-LCD device may be fabricated using a four-mask process including a diffraction exposure method.

In accordance with the present invention, color shift is prevented because of the circular areas formed between the arc shaped pixel and common electrodes. Further, because the liquid crystal directors have uniform directions on all sides, the viewing angle is improved and the grain inversion decreases. According to a second embodiment, the aperture ratio of the IPS-LCD device is increased and display images contain higher resolution by reducing area covered by the black matrix.

It will be apparent to those skilled in the art that various modifications and variation can be made in the array substrate of the present invention without departing from the spirit or scope of the invention. Thus, it is intended that the present invention cover the modifications and variations of this invention provided they come within the scope of the appended claims and their equivalents.

What is claimed is:

1. A method of forming an array substrate for use in an in-plane switching liquid crystal display device, comprising;
    forming gate lines, common lines, gate electrodes, and common electrodes, wherein the common line is disposed between two gate lines, the gate electrode extends from the gate lines toward the common line, and the common electrode extending from the common line is arc shaped;
    forming a gate insulating layer on the gate lines, common lines, gate electrodes, and common electrodes;
    forming a semiconductor layer on the gate insulating layer, the semiconductor layer including a first layer of pure amorphous silicon and a second layer of doped amorphous silicon;
    forming data lines, source electrodes and drain electrodes, wherein the data lines are substantially perpendicular to and cross the gate and common lines, each of the source electrodes extending from the data lines over a first end portion of the semiconductor layer, each of the drain electrodes being spaced from a corresponding source electrode and overlapping a second end portion of the semiconductor layer, and pairs of the gate and data lines defining a pixel region, wherein the pixel region is divided into a plurality of sub pixels;
    forming a passivation layer on the data lines, the source electrodes and the drain electrodes, the passivation layer having drain contact holes exposing a portion of the drain electrodes; and
    forming capacitor electrodes and pixel electrodes, the capacitor electrodes being disposed over a portion of the common electrodes and in contact with the drain electrodes through the drain contact holes in each of the sub pixels, wherein the pixel electrodes are connected to the capacitor electrodes in each of the sub pixels through a pixel connecting line,
    wherein the common electrodes and the pixel electrodes are arc shaped within the pixel region.

2. The method of claim 1, wherein each of the data lines is disposed adjacent to a data line of a neighboring pixel and each of the gate lines is disposed adjacent to a gate line of a neighboring pixel.

3. The method of claim 1, wherein the pixel region is divided into red, green, blue and white sub pixels.

4. The method of claim 1, wherein the pixel region is divided into red, green and blue sub pixels.

5. The method of claim 1, wherein the common electrodes are divided into two parts, each having a semicircular shape.

6. The method of claim 5, wherein the common electrodes include a first common electrode pattern surrounding peripheries of the pixel region, the first common electrode pattern having a circular opening.

7. The method of claim 6, wherein the common electrodes further include second and third common electrode patterns inside the circular opening.

8. The method of claim 7, wherein the pixel connecting line extends from the capacitor electrodes, and the pixel electrodes extend from the pixel connecting line.

9. The method of claim 8, wherein the pixel electrodes include a first pixel electrode pattern between the first and second common electrode patterns and a second pixel electrode pattern between the second and third common electrode patterns.

10. The method of claim 9, wherein the capacitor electrode and the first common electrode pattern form a storage capacitor.

11. The method of claim 9, wherein each sub pixel has a pixel electrode.

12. The method of claim 9, wherein the pixel electrodes are simultaneously formed in each of the sub pixels.

13. The method of claim 1, further comprising forming a black matrix covering a portion corresponding to the gate and data lines, a thin film transistor, and the pixel connecting line.

* * * * *